(12) United States Patent
Tao

(10) Patent No.: US 11,979,819 B2
(45) Date of Patent: May 7, 2024

(54) COMMUNICATION METHOD AND APPARATUS

(71) Applicant: ALIBABA GROUP HOLDING LIMITED, Grand Cayman (KY)

(72) Inventor: Zhen Tao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/166,329

(22) Filed: Feb. 3, 2021

(65) Prior Publication Data
US 2021/0258863 A1 Aug. 19, 2021

Related U.S. Application Data

(63) Continuation of application No. PCT/CN2019/097431, filed on Jul. 24, 2019.

(51) Int. Cl.
| | | |
|---|---|---|
| *H04W 64/00* | (2009.01) | |
| *H04W 48/16* | (2009.01) | |
| *H04W 72/02* | (2009.01) | |
| *H04W 16/14* | (2009.01) | |

(52) U.S. Cl.
CPC ............ *H04W 48/16* (2013.01); *H04W 64/00* (2013.01); *H04W 72/02* (2013.01); *H04W 16/14* (2013.01)

(58) Field of Classification Search
CPC ..... H04W 48/16; H04W 64/00; H04W 72/02; H04W 16/14; H04W 48/18; H04W 48/14; H04W 16/10
See application file for complete search history.

(56) References Cited

U.S. PATENT DOCUMENTS

| | | | | |
|---|---|---|---|---|
| 5,950,130 A | * | 9/1999 | Coursey | H04W 48/16 455/432.1 |
| 5,974,328 A | * | 10/1999 | Lee | H04W 48/18 455/168.1 |
| 5,983,115 A | * | 11/1999 | Mizikovsky | H04W 48/18 455/435.2 |

(Continued)

FOREIGN PATENT DOCUMENTS

| | | |
|---|---|---|
| CN | 1942011 A | 4/2007 |
| CN | 101669390 A | 3/2010 |

(Continued)

OTHER PUBLICATIONS

PCT International Search Report and Written Opinion dated Oct. 9, 2019 issued in corresponding International Application No. PCT/CN2019/097431 (8 pgs.).

(Continued)

*Primary Examiner* — Marcus Hammonds
(74) *Attorney, Agent, or Firm* — Finnegan, Henderson, Farabow, Garrett & Dunner, LLP

(57) ABSTRACT

Embodiments of the present disclosure provide a communication method and a communication apparatus. The method incudes acquiring, from a preset public network access channel, unique network identification information of a region where the terminal is located; determining a spectrum standard corresponding to the region where the terminal is located according to the public network access channel and the unique network identification information; and communicating according to the spectrum standard.

18 Claims, 2 Drawing Sheets

A terminal acquires unique network identification information of a region where the terminal is located from a preset public network access channel — 101

The terminal determines a spectrum standard corresponding to the region where the terminal is located according to the public network access channel and the unique network identification information — 102

The terminal communicates according to the spectrum standard — 103

(56) References Cited

U.S. PATENT DOCUMENTS

| | | | |
|---|---|---|---|
| 2003/0003922 A1* | 1/2003 | McClure | H04W 48/18 455/419 |
| 2004/0192328 A1* | 9/2004 | Giacalone | H04W 48/18 455/450 |
| 2004/0203893 A1* | 10/2004 | Kotzin | H04W 48/18 455/414.1 |
| 2009/0325594 A1 | 12/2009 | Lan et al. | |
| 2012/0122477 A1 | 5/2012 | Sadek et al. | |
| 2018/0167982 A1* | 6/2018 | Lee | H04W 28/02 |

FOREIGN PATENT DOCUMENTS

| | | | |
|---|---|---|---|
| CN | 101690343 A | 3/2010 | |
| CN | 105554697 A | 5/2016 | |
| CN | 105657790 A | 6/2016 | |
| EP | 1740001 A1 * | 1/2007 | H04W 48/16 |
| WO | WO 2020/024853 A1 | 2/2020 | |

OTHER PUBLICATIONS

First Chinese Search Report issued in corresponding Chinese Application No. 201810877218.3 dated Jul. 21, 2020 (2 pages).

* cited by examiner

COMMUNICATION METHOD AND APPARATUS

CROSS-REFERENCE TO RELATED APPLICATION

The present disclosure claims the benefits of priority to International Application No. PCT/CN2019/097431, filed on Jul. 24, 2019, which claims priority to Chinese Patent Application No. 201810877218.3, filed on Aug. 3, 2018, both of which are incorporated herein by reference in their entireties.

BACKGROUND

Internet of Things (IoT) is the third information technology revolution after computers and the Internet. IoT has advantages of real-time performance and interactivity, and has been widely used in urban management, digital home, positioning and navigation, logistics management, and security systems. Long Range (LoRa) is an ultra-long-distance transmission scheme based on a spread spectrum technology in technologies of Internet of Things. LoRa has characteristics of long transmission distance, low power consumption, multiple nodes, and low cost.

According to a Long Range Wide Area Network (LoRaWAN) protocol, spectrum standards in different regions are different. However, when a LoRa terminal is roaming, the LoRa terminal cannot determine which region it is located in. Therefore, the spectrum standard corresponding to the region cannot be activated.

SUMMARY

Embodiments of the present disclosure provide a communication method and a communication apparatus. The method incudes acquiring, from a preset public network access channel, unique network identification information of a region where the terminal is located; determining a spectrum standard corresponding to the region where the terminal is located according to the public network access channel and the unique network identification information; and communicating according to the spectrum standard.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings.

DETAILED DESCRIPTION

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

According to the embodiments, a terminal can automatically determine a spectrum standard of a region where the terminal is located according to a public network access channel and a unique network identification information, and then the terminal is enabled to communicate according to the spectrum standard of the region. The terminal is capable of determining the spectrum standard of the region without relying on a spectrum standard switching apparatus, or relying on manual operation for switching the spectrum. The solutions consistent with the embodiments provide improved convenience for operations of a terminal across regions.

A LoRa network includes a terminal node, a base station node, and a server. The terminal has a LoRa network connection capability and accesses the LoRa network. According to different scenarios to which the LoRa network is deployed, the terminal can include different electronic devices. For example, when the LoRa network is applied to urban management, the terminal can include a smart meter; and when the LoRa network is applied to a digital home, the terminal can include various smart home appliances, etc.

The base station, also known as a gateway or concentrator in the LoRa network, has the function of wireless connection and convergence, including an entry for the terminal to access the LoRa network, forwarding data from the server or the terminal, and implementing the data exchange between the terminal and the server. The base station can also exchange data with other base stations within a signal coverage range of the base station by transmitting radio frames.

The server can include a server or a server cluster, which is configured to perform service processing according to data obtained from the base station or the terminal, and to control a working mode and working state of the base station or the terminal.

Figure 1:
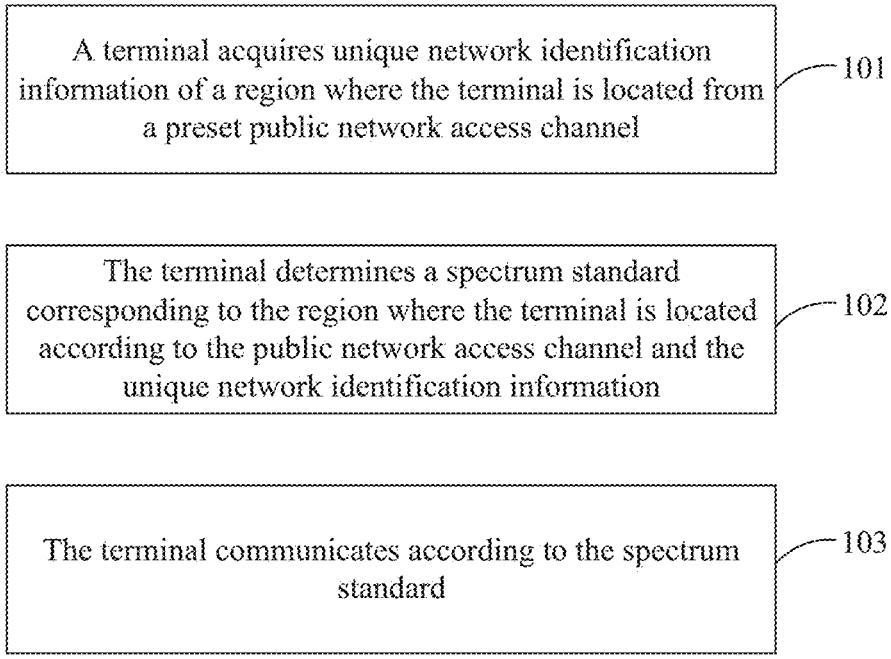
FIG. 1 is a flowchart of an exemplary communication method by a terminal, consistent with some embodiments of the present disclosure.

FIG. 1 is a flowchart of an exemplary communication method by a terminal, consistent with some embodiments of the present disclosure. The method can include the following steps.

In step 101, a terminal acquires unique network identification information of a region where the terminal is located from a preset public network access channel.

A LoRaWAN protocol specifies spectrum standards in different regions, for example, China 470 MHz ISM (Industrial Scientific Medical) band spectrum standards, China 920 MHz ISM band spectrum standards, Japan 920 MHz ISM band spectrum standards, Singapore 920 MHz ISM band spectrum standards, etc. The spectrum standard specifies physical layer parameters such as ISM band, channel frequency, data rate, transmit power, and available channel field CFList (channel frequency list) of terminals in different regions.

In some embodiments, a LoRa device is preset with at least one public network access channel. The public network access channel can be a common frequency point of multiple regional spectrum standards.

The terminal can initiate network access through the public network access channel, and acquire unique network identification information of a region where the terminal is located after accessing the network. The unique network identification information of adjacent or overlapping networks of the region cannot be the same.

In some embodiments, step 101 can include the following sub-steps.

In sub-step S11, the terminal sends a network access request frame to a server on the preset public network access channel, and receives a network access response frame sent by the server on the public network access channel.

The terminal can send a network access request frame (Join-request) to the server on the public network access channel, and the server can send a network access response frame (Join-accept) to the terminal after receiving the network access request frame.

In sub-step S12, the terminal parses the network access response frame to obtain the unique network identification information.

In some embodiments, the unique network identification information can be a network identifier NetID.

Specifically, the network access response frame can include: a network identifier NetID and a terminal address DevAddr.

The network identifier NetID is an identifier of a network of an operator. This network can be across regions and countries. The LoRa Alliance allocates a 24-bit unique network identifier NetID for all networks.

Further, in some embodiments, the unique network identification information can also be composed of several bits of the network identifier NetID and the terminal address DevAddr.

The terminal address DevAddr is composed of 32 bits and is used to identify the terminal in the current network. The terminal address DevAddr is allocated by a network server connected to the terminal. The terminal address DevAddr includes an address prefix AddrPrefix and a network address NwkAddr.

Bits [31 . . . N] of the terminal address DevAddr are the address prefix AddrPrefix, and bits [N-1 . . . 0] are the network address NwkAddr.

Specifically, the unique network identification information can be composed of the network identifier NetID and several bits connected to the terminal address DevAddr in the network address NwkAddr.

For example, when N is 25, bits 31, 30, 29, 28, 27, 26, and 25 of the terminal address DevAddr are the address prefix AddrPrefix, and bits 24, 23, . . . , 0 of the terminal address DevAddr are the network address NwkAddr. Then the unique network identification information can be composed of the network identifier NetID and bits 24, 23, 22, and 21 of the terminal address DevAddr.

Several bits connected to the terminal address DevAddr in the network address NwkAddr are also used as part of the unique network identification information, and the operator network can be further divided into several subnets, so that the unique network identification information can uniquely identify a subnet.

In some embodiments, the method can further include that: if the terminal does not receive a network access response frame after sending the network access request frame on one preset public network access channel, the terminal sends the network access request frame on another preset public network access channel.

If the terminal does not receive a network access response frame after sending the network access request frame on one public network access channel, the terminal selects another public network access channel to send the network access request frame again.

In step 102, the terminal determines a spectrum standard corresponding to the region where the terminal is located according to the public network access channel and the unique network identification information;

In some embodiments, the combination of the public network access channel and the unique network identification information uniquely corresponds to the spectrum standard of a region.

In some embodiments, step 102 can include that: the terminal searches for a spectrum standard matching the public network access channel and the unique network identification information from one or more preset spectrum standards corresponding to multiple regions.

The terminal uses the public network access channel and the unique network identification information as an index, and searches for a matching spectrum standard from preset spectrum standards corresponding to multiple regions.

In step 103, the terminal communicates according to the spectrum standard.

After the terminal determines the spectrum standard of the region where the terminal is located, radio frames can be sent and received subsequently according to the spectrum standard.

Specifically, step 103 can include the following sub-steps.

In sub-step S21, the terminal parses an available channel field of the network access response frame according to the spectrum standard to obtain an available channel.

In some embodiments, the network access response frame includes an available channel field CFList. The available channel field CFList indicates a channel available for subsequent communication of the terminal.

The available channel field CFList of different spectrum standards has different parsing rules, and the terminal can parse the available channel field CFList according to the determined spectrum standard to obtain an available channel.

In sub-step S22, the terminal communicates on the available channel.

The terminal can select the available channel to send and receive radio frames subsequently.

According to the embodiments, a terminal can automatically determine a spectrum standard of a region where the terminal is located according to a public network access channel and a unique network identification information, and then the terminal is enabled to communicate according to the spectrum standard of the region. The terminal is capable of determining the spectrum standard of the region without relying on a spectrum standard switching apparatus or relying on manual operation for switching the spectrum. The solutions consistent with the embodiments provide improved convenience for operations of a terminal across regions.

Figure 2:
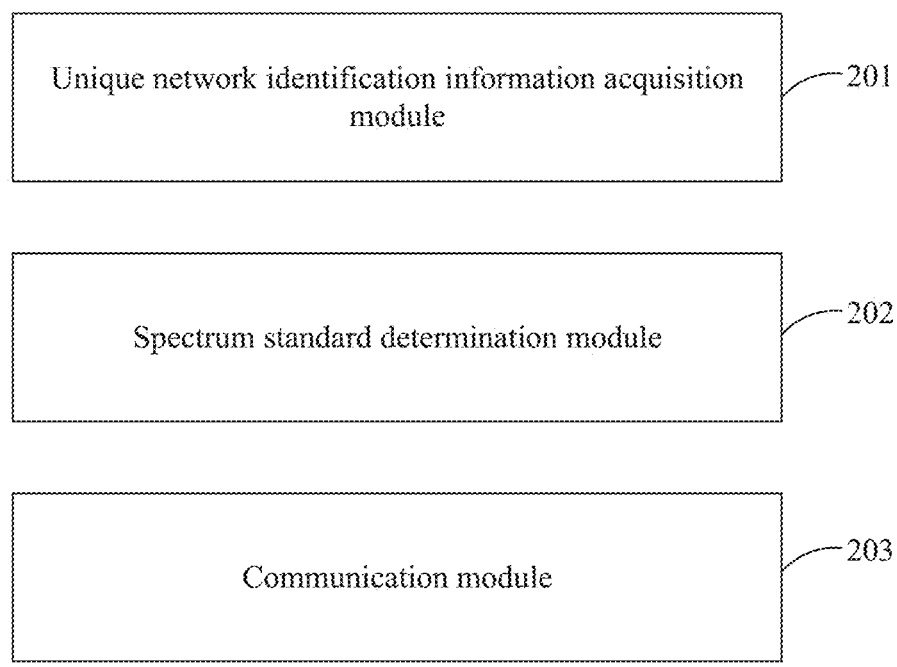
FIG. 2 is a structural block diagram of an exemplary communication apparatus, consistent with some embodiments of the present disclosure.

FIG. 2 is a structural block diagram of an exemplary communication apparatus, consistent with some embodiments of the present disclosure. The apparatus can be a terminal. The apparatus can include a unique network identification information acquisition module 201, a spectrum standard determination module 202, and a communication module 203.

Unique network identification information acquisition module 201 is configured to acquire unique network identification information of a region where the terminal is located from a preset public network access channel.

Spectrum standard determination module 202 is configured to determine a spectrum standard corresponding to the region where the terminal is located according to the public network access channel and the unique network identification information.

Communication module 203 is configured to communicate according to the spectrum standard.

In some embodiments, unique network identification information acquisition module 201 can include a wireless frame transceiving sub-module and a unique network identification information obtaining sub-module.

The wireless frame transceiving sub-module is configured to send a network access request frame to a server on the preset public network access channel and receive a network access response frame sent by the server on the public network access channel.

The unique network identification information obtaining sub-module is configured to parse the network access response frame to obtain the unique network identification information.

In some embodiments, spectrum standard determination module 202 can include: a spectrum standard determination sub-module configured to search for a spectrum standard matching the public network access channel and the unique network identification information from preset spectrum standards corresponding to multiple regions.

In some embodiments, communication module 203 can include an available channel obtaining sub-module and a communication sub-module.

The available channel obtaining sub-module is configured to parse an available channel field of the network access response frame according to the spectrum standard to obtain an available channel.

The communication sub-module is configured to communicate on the available channel.

In some embodiments, the apparatus can further include: a network access request frame sending module configured to, if the terminal does not receive a network access response frame after sending the network access request frame on one preset public network access channel, send the network access request frame on another preset public network access channel.

In some embodiments, the network access response frame includes: a network identifier NetID and a terminal address DevAddr; and the unique network identification information is the network identifier NetID, or is composed of several bits of the network identifier NetID and the terminal address DevAddr.

According to the embodiments, a terminal can automatically determine a spectrum standard of a region where the terminal is located according to a public network access channel and a unique network identification information, and then the terminal is enabled to communicate according to the spectrum standard of the region. The terminal is capable of determining the spectrum standard of the region without relying on a spectrum standard switching apparatus, or relying on manual operation for switching the spectrum. The solutions consistent with the embodiments provide improved convenience for operations of a terminal across regions.

The embodiments of this disclosure also provide an apparatus, including: a memory storing a set of instructions; and one or more processors configured to execute the set of instructions to cause the apparatus to perform the above-mentioned method.

The embodiments of this disclosure also provide a non-transitory computer readable medium that stores a set of instructions that is executable by at least one processor of a computer to cause the computer to perform the above-mentioned method.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

As used herein, unless specifically stated otherwise, the term "or" encompasses all possible combinations, except where infeasible. For example, if it is stated that a device may include A or B, then, unless specifically stated otherwise or infeasible, the device may include A, or B, or A and B. As a second example, if it is stated that a device may include A, B, or C, then, unless specifically stated otherwise or infeasible, the device may include A, or B, or C, or A and B, or A and C, or B and C, or A and B and C.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

Further, the units described as separate parts may or may not be physically separate. Parts displayed as units may or may not be physical units. They may be located in a same location or may be distributed on a plurality of network units. Some or all of the units may be selected according to actual needs to achieve the objectives of the solutions of the embodiments. In addition, functional units in the embodiments of the present disclosure may be integrated into one processing unit. Each of the units may exist alone physically, or two or more units can be integrated into one unit. The integrated unit may be implemented in a form of hardware or may be implemented in a form of a software functional unit.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

What is claimed is:

1. A communication method performed by a terminal having a terminal address, the method comprising:
   acquiring, from a preset public network access channel, unique network identification information of a region where the terminal is located;
   determining a spectrum standard corresponding to the region where the terminal is located according to the public network access channel and the unique network identification information; and
   communicating according to the spectrum standard;
   wherein the terminal address includes an address prefix and a network address, and the unique network identification information comprises a combination of a network identifier and a plurality of bits of the network address.

2. The method according to claim 1, wherein acquiring, from the preset public network access channel, unique network identification information of the region where the terminal is located comprises:
   sending a network access request frame to a server on the preset public network access channel;
   receiving a network access response frame sent by the server on the public network access channel; and
   parsing the network access response frame to obtain the unique network identification information.

3. The method according to claim 1, wherein determining the spectrum standard corresponding to the region where the terminal is located according to the public network access channel and the unique network identification information comprises:
   searching for a spectrum standard matching the preset public network access channel and the unique network identification information among one or more preset spectrum standards corresponding to a plurality of regions.

4. The method according to claim 2, wherein communicating according to the spectrum standard comprises:
   parsing an available channel field of the network access response frame according to the spectrum standard to obtain an available channel; and
   communicating on the available channel.

5. The method according to claim 2, further comprising:
   in response to not having received the network access response frame after sending the network access request frame on the preset public network access channel, sending the network access request frame on another preset public network access channel.

6. The method according to claim 2, wherein the network access response frame comprises the network identifier and the terminal address.

7. A communication apparatus comprising:
   a memory storing a set of instructions; and
   one or more processors configured to execute the set of instructions to cause the apparatus to perform:
   acquiring, from a preset public network access channel, unique network identification information of a region where a terminal having a terminal address is located;
   determining a spectrum standard corresponding to the region where the terminal is located according to the public network access channel and the unique network identification information; and
   communicating according to the spectrum standard;
   wherein the terminal address includes an address prefix and a network address, and the unique network identification information comprises a combination of a network identifier and a plurality of bits of the network address.

8. The apparatus according to claim 7, wherein acquiring, from the preset public network access channel, unique network identification information of the region where the terminal is located comprises:
   sending a network access request frame to a server on the preset public network access channel;
   receiving a network access response frame sent by the server on the public network access channel; and
   parsing the network access response frame to obtain the unique network identification information.

9. The apparatus according to claim 7, wherein determining the spectrum standard corresponding to the region where the terminal is located according to the public network access channel and the unique network identification information comprises:
   searching for a spectrum standard matching the preset public network access channel and the unique network identification information among one or more preset spectrum standards corresponding to a plurality of regions.

10. The apparatus according to claim 8, wherein
    communicating according to the spectrum standard comprises:
    parsing an available channel field of the network access response frame according to the spectrum standard to obtain an available channel; and
    communicating on the available channel.

11. The apparatus according to claim 8, wherein the one or more processors are configured to execute the set of instructions to cause the apparatus to further perform:
    in response to not having received the network access response frame after sending the network access request frame on the preset public network access channel, sending the network access request frame on another preset public network access channel.

12. The apparatus according to claim 8, wherein the network access response frame comprises the network identifier and the terminal address.

13. A non-transitory computer readable medium that stores a set of instructions that is executable by at least one processor of a computer to cause the computer to perform a communication method, the method comprising:
   acquiring, from a preset public network access channel, unique network identification information of a region where a terminal having a terminal address is located;
   determining a spectrum standard corresponding to the region where the terminal is located according to the public network access channel and the unique network identification information; and
   communicating according to the spectrum standard;
   wherein the terminal address includes an address prefix and a network address, and the unique network identification information comprises a combination of a network identifier and a plurality of bits of the network address.

14. The computer readable medium of claim 13, wherein acquiring, from the preset public network access channel, unique network identification information of the region where the terminal is located comprises:
   sending a network access request frame to a server on the preset public network access channel;
   receiving a network access response frame sent by the server on the public network access channel; and
   parsing the network access response frame to obtain the unique network identification information.

15. The computer readable medium of claim 13, wherein determining the spectrum standard corresponding to the region where the terminal is located according to the public network access channel and the unique network identification information comprises:
   searching for a spectrum standard matching the preset public network access channel and the unique network identification information among one or more preset spectrum standards corresponding to a plurality of regions.

16. The computer readable medium of claim 14, wherein communicating according to the spectrum standard comprises:
   parsing an available channel field of the network access response frame according to the spectrum standard to obtain an available channel; and
   communicating on the available channel.

17. The computer readable medium of claim 14, wherein the at least one processor configured to execute the set of instructions to cause the computer to further perform:
   in response to not having received the network access response frame after sending the network access request frame on the preset public network access channel, sending the network access request frame on another preset public network access channel.

18. The computer readable medium of claim 14, wherein the network access response frame comprises the network identifier and the terminal address.

* * * * *